(12) United States Patent
Stassinopoulos

(10) Patent No.: US 7,465,926 B2
(45) Date of Patent: Dec. 16, 2008

(54) DEVICE SYSTEM AND METHOD FOR MINIATURIZED RADIATION SPECTROMETER

(75) Inventor: Epaminondas G. Stassinopoulos, Potomac, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/537,280

(22) Filed: Sep. 29, 2006

(65) Prior Publication Data

US 2008/0078936 A1 Apr. 3, 2008

(51) Int. Cl.
*G01T 1/16* (2006.01)
(52) U.S. Cl. .................................. 250/336.1
(58) Field of Classification Search ............... 250/336.1
See application file for complete search history.

(56) References Cited

U.S. PATENT DOCUMENTS

2005/0023479 A1* 2/2005 Grodzins ............... 250/390.11

* cited by examiner

*Primary Examiner*—David P Porta
*Assistant Examiner*—Marcus H Taningco
(74) *Attorney, Agent, or Firm*—Christopher O. Edwards

(57) ABSTRACT

A device/system for radiation sensing is configured to detect high and low LET radiation. The radiation sensing system may include a high LET detector and a low LET detector coupled to the high LET detector by a CPU, wherein the high LET detector and the low LET detector are assembled within a single unit. The device/system may also include a high LET and low LET detector that may be coupled together without an internal CPU. Overall, the device/system may be a standalone system and/or coupled to an external processing device. The device/system may also be approximately 6×6×2 $cm^3$ in size, making it hand portable and may weigh less or equal to approximately ninety (90) grams, and operate on less than or approximately 0.25 watts of power.

27 Claims, 1 Drawing Sheet

DEVICE SYSTEM AND METHOD FOR MINIATURIZED RADIATION SPECTROMETER

ORIGIN OF THE INVENTION

The invention described herein was made by an employee of the United States Government, and may be manufactured and used by or for the Government for governmental purposes without the payment of any royalties thereon or therefor.

FIELD OF THE INVENTION

This disclosure relates generally to sensing devices. More particularly, this disclosure is directed to a nuclear radiation spectrometer, and techniques for realizing high efficiency and portability.

BACKGROUND

When traveling outside of the Earth's atmosphere, the magnetic fields and radiation levels increase. Radiation is a general term for energy which radiates out from a source and which can be a particulate or part of the electromagnetic spectrum. Radiation spectrometers are devices that are utilized to determine what kind of energy is present. When, for example, a large vehicle, such as an aircraft, spacecraft, or satellite travels through, for example, a variety of primary high-energy cosmic rays, i.e. radiation originating from outside the Earth's atmosphere, the vehicle may absorb the rays of energy and convert them into neutrons that generate nuclear energy inside of the aircraft. Typically, the thick structure of the vehicle multiplies the primary particles so that there are more neutrons trapped inside the vehicle than the original number of rays from the electromagnetic fields that created them.

Conventional radiation spectrometers or detectors may be characterized by several disadvantages. Some of the disadvantages associated with current radiation spectrometers are related to the fact that the weight, size, and power requirements of currently existing spectrometers make their use costly and problematic for many applications today. Currently, two independent instruments may be required to respond to high and low linear energy transfer (LET) emissions. Many applications today, whether space craft or ground based applications, may benefit from a radiation spectrometer device that has dual capability as it relates to high and low energy detection.

It has been common to design military and commercial aircraft with fly-by-wire control systems. In fly-by-wire systems, the aircraft is controlled, at least in part, by electrical signals generated from sensors in the aircraft. The sensors are often utilized to measure aerodynamic quantities that may affect the performance of the aircraft's controls. Sensors may also be utilized to measure a pilot's control actions. These fly-by-wire control systems may be affected by the radiation levels that exist in high altitudes. Thus, radiation spectrometers may be utilized to sense the type and quantity of the nuclear energy present.

A radiation spectrometer may also be utilized to alert an individual of the level of nuclear energy present. Because the spectrum of nuclear energy is vast, devices are typically designed to detect a portion of the spectrum. The spectrum can be divided into low linear energy transfer (LET) radiation and high LET radiation or into strongly penetrating radiation and weakly penetrating radiation (as an indication of its ability to penetrate shielding or the human body). Typically, a spacecraft may include a high LET spectrometer and a low LET spectrometer. Low LET may be defined as the energy transfer characteristic of light charged particles. Low LET may be characterized as radiation with low linear energy transfer, normally assumed to comprise photons (including X rays and gamma radiation), electrons, positrons and muons. Low LET may also be characterized according to the distance between ionizing events, which is large on the scale of a cellular nucleus. High LET refers to an energy transfer characteristic of heavy charged particles. High LET may be defined as radiation with high linear energy transfer, normally assumed to comprise protons, neutrons and alpha particles (or other particles of similar or greater mass).

When a separate high LET spectrometer and low LET spectrometer are utilized, an individual may experience difficulty transporting even a single spectrometer between different environments. Accordingly, it may be desirable to develop a spectrometer capable of detecting high LET radiation and low LET radiation. It may also be desirable to combine both the high and low radiation detection functions, and thus, reduce redundancy in component parts. Further, it is desirous to develop small and lightweight devices that are inexpensive to manufacture, and accordingly, reduce the cost to fly an aircraft. Moreover, it is desirous to develop a device that conserves power and thus, is less burdensome on flight resources.

A single LET spectrometer may weigh about 214 grams and be approximately 4.5 inches×4.5 inches×0.5 inches in size. It is well known that high LET spectrometers and low LET spectrometers have components in common. Accordingly, having a high LET spectrometer and a low LET spectrometer on board an aircraft or spacecraft results in redundancy, as each of the high and low radiation spectrometers have parts in common. Each spectrometer may also have its own power requirements, thus placing an addition burden on the aircraft or spacecraft.

Radiation spectrometers may also have applications on the ground. For example, radiation spectrometers may have security applications. These spectrometers may be used to detect radiation in shipping containers, at airport security locations or any ground based security station where radiation detection may be desired. Thus, any security applications where high and/or low radiation detection is desirable may have a need for a radiation spectrometer that can provide both levels of detection. Typically, both a high and low LET radiation spectrometer would be utilized. It may also be desirous to have a single portable spectrometer capable of detecting both high and low LET radiation for the ground based applications thereby reducing the number of test instruments required.

For reasons stated herein, there may be a need in the art to provide a small, lightweight radiation spectrometer device that detects both high and low LET radiation, reduces the cost of manufacturing and is pocket portable.

SUMMARY OF THE INVENTION

The above-mentioned shortcomings, disadvantages and problems are addressed herein, which will be understood by reading and studying the following disclosure.

In one embodiment of the present invention, a system for radiation sensing may detect high and low LET radiation. The radiation sensing system may include a high LET detector and a low LET detector coupled to the high LET detector by a CPU, wherein the high LET detector and the low LET detector may be assembled within a single unit.

In another embodiment of the present invention, a method of sensing radiation is disclosed. The method of sensing radiation may include sensing high LET radiation, generating a high LET radiation signal, outputting a high LET radiation signal to a CPU, sensing low LET radiation, generating a low LET radiation signal, and outputting the low LET radiation signal to a CPU.

In another embodiment of the present invention, a system for radiation sensing may be disclosed that may include a high LET detector and a low LET detector coupled by a CPU, wherein the high LET detector and the low LET detector are assembled within a single unit, and wherein the system operates on a range of about 0 to about 0.25 watts of power.

In yet another embodiment of the present invention, a system for radiation sensing may be disclosed that may include a high LET detector and a low LET detector coupled by a CPU, wherein the high LET detector and the low LET detector may be assembled within a single unit, and wherein the unit is less than or equal to about 6×6×2 $cm^3$ in size.

In still another embodiment of the present invention, a radiation sensing device may be disclosed that may include a high LET detector and a low LET detector coupled to the high LET detector by a CPU, wherein the high LET detector and the low LET detector may be assembled within a single unit.

In another embodiment of the present invention, a radiation sensing device may be disclosed that may include a high LET detector, and a low LET detector coupled to the high LET detector by a CPU, wherein the high LET detector and the low LET detector are assembled within a single unit, and wherein the system operates on a range of about 0 to about 0.25 watts of power.

In yet another embodiment of the present invention, a radiation sensing device may be disclosed that may include a high LET detector, and a low LET detector coupled to the high LET detector by a CPU, wherein the high LET detector and the low LET detector may be assembled within a single unit.

In another embodiment of the present invention, a radiation sensing device may be disclosed that may include a high LET detector, and a low LET detector coupled to the high LET detector by a CPU, wherein the high LET detector and the low LET detector may be assembled within a single unit, and wherein the unit is less than or equal to about 6×6×2 $cm^3$ in size.

Further, in another embodiment of the present invention, a radiation sensing device may be disclosed that includes a high LET detection module and a low LET detection module, wherein the high LET detection module may be electrically coupled to the low LET detection module.

Radiation sensing devices systems and methods for sensing energy, for example, nuclear energy, of varying scope are described herein. In addition to the aspects and advantages described in this summary, further aspects and advantages will become apparent by reference to the drawing and by reading the detailed description that follows.

DETAILED DESCRIPTION

Figure 1:
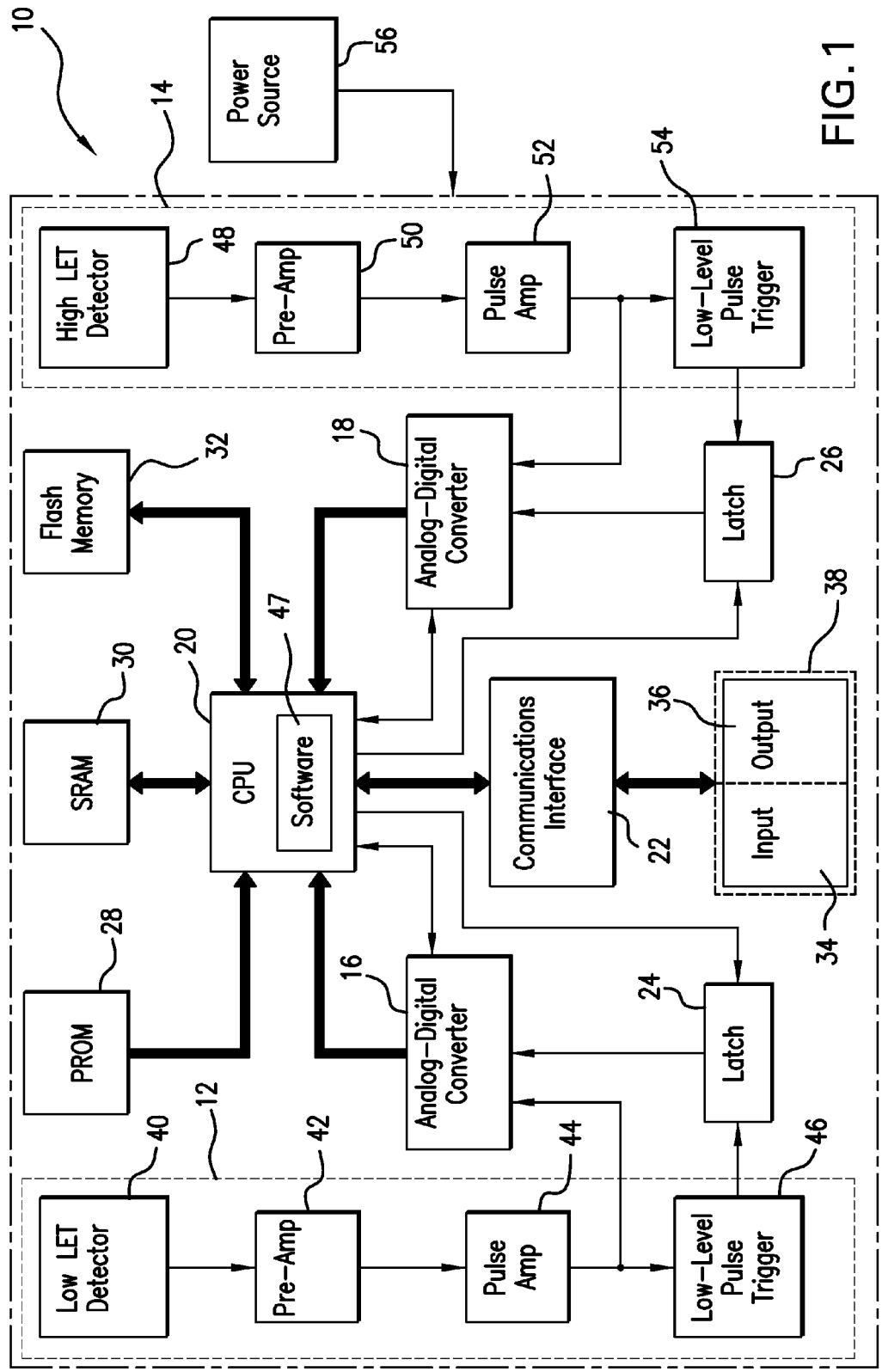
FIG. 1 shows a simplified block diagram of an overview of a radiation sensing device and system in accordance with an embodiment of the present invention

In the following detailed description, reference is made to the accompanying drawing that forms a part hereof, and in which is shown, by way of illustration, specific embodiments, which may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments. Ranges of parameter values described herein are understood to include all subranges falling therewithin. The following detailed description is, therefore, not to be taken in a limiting sense.

I. System Overview

FIG. 1 is a simplified block diagram of an overview of a radiation sensing system 10 that senses, identifies and/or measures an amount of radiation, for example nuclear radiation. The radiation sensing system 10 of the present invention may be configured to detect high and low LET energy from electromagnetic and corpuscular radiation, including their secondaries, along with progeny from nuclear interactions.

The sensing functions of the system 10 are performed by the analog low LET detection module 12 and the high LET detection module 14. After the radiation may be sensed, the digital components of system, which may include a first analog to digital converter 16, a second analog to digital converter 18, a central processing unit (CPU) 20, a communications interface 22, a first latch 24, a second latch 26, a programmable read-only device (PROM) 28, static random access memory (SRAM) device 30, and flash memory device 32. The system 10 may also include an input device 34, for example a keypad or keyboard, an output device 36, for example, a monitor or alerting device, and/or a combination input and output device 38 that may be a combination of an input and output device.

II. The Detection Modules

In one embodiment, a system 10 includes a high LET detection module 14 electrically coupled, for example, by a wireless or wireline connection, to a low LET detection module 12 for sensing different portions of electromagnetic spectrum. By combining the low LET detector module with the high LET detector module in a single device, any energy falling between the low LET portion of the spectrum and the high LET portion of the spectrum may be captured as well. Accordingly, the radiation sensing system 10 of the present invention may sense radiation that may not be sensed by a spectrometer designed solely for either a high or low LET spectrometer. By way of example, the low LET radiation spectrum may comprise photons (including X rays and gamma radiation), electrons, positrons and muons. Further, by way of example, the high LET radiation spectrum may comprise alpha particles, galactic and solar cosmic rays and their daughter products, such as neutrons, heavy ions, and protons.

During operation of the low LET detector module 12, when energy is deposited at or near a low LET detector 40, the low LET detector 40 may collect the particle induced charge and output a charge pulse to a first preliminary amplifier 42 with little or no gain. In one embodiment of the present invention, the first preliminary amplifier 42 receives the charge pulse and transfers the signal to a voltage pulse. The voltage pulse may then be passed to a first pulse amplifier 44 where significant gain may take place. Further, the signal may be digitized by the first analog to digital converter 16. A first low-level pulse trigger 46 may be utilized to decide whether the pulse amplitude satisfies the threshold limit. If the pulse amplitude satisfies the threshold limit, the first low level pulse trigger may signal the CPU 20 to analyze the signal according to operating software 47 of the CPU 20. In order to manage the data flow and direct the flow in accordance with the software 47, a first latch 24 may be coupled to the CPU 20 and first low level pulse trigger 46. In one embodiment of the present invention, the CPU may be external to the system 10.

In one embodiment, the low LET detector 40 may be a surface mount detector, rectangular in shape, approximately 1.4 cm in length, in the range of 300-500 microns in thickness, for example, a surface mount Canberra detector or a surface mount silicon-carbide detector.

In another embodiment, a high LET detection module 14 may be capable of detecting energy deposited by alpha particles, galactic and solar cosmic rays and their daughter products, such as neutrons, heavy ions, and protons, from, for example, interactions with spacecraft or aircraft materials and atmospheric constituents, such as oxygen and nitrogen. If exposed to trapped Van Allen Belt protons and/or to Solar Proton Events (SPEs) during periods of solar activity, the high LET detection module 14 may also detect their spallation, fractionation and recoil products in, for example, spacecraft and airplanes.

Similar in functioning to the low LET detection module 12, once energy is deposited at or near a high LET detector 48, the detector may collect the particle induced charge and outputs a charge pulse to a second preliminary amplifier 50 with little or no gain. The second preliminary amplifier 50 receives the charge pulse and transfers the signal to a voltage pulse. The voltage pulse may be passed to a second pulse amplifier 52 where significant gain may take place. The signal may be digitized by the second analog to digital converter 18. A second low-level pulse trigger 54 decides whether the pulse amplitude satisfies the threshold limit. If the pulse amplitude satisfies the threshold limit, the second low level pulse trigger 54 signals the CPU 20 to analyze the signal. A second latch 26 may be coupled to the second low-level pulse trigger and the CPU 20 to manage the data flow and direct the flow in accordance with a software program. In one embodiment of the present invention, the high LET detector 48 may be a silicon-carbide detector.

III. System Operation Overview

In another embodiment, each of the low LET detection module 12 and the high LET detection module 14 generates an analog output. The analog output of the low LET detection module 12 and the high LET detection module 14 is converted to a digital signal by the first analog to digital converter 16 and the second analog to digital converter 18, respectively. In one embodiment of the present invention, the converted signal from the first analog to digital converter 16 and the second analog to digital converter 18 may be output to the CPU 20.

The CPU 20 is run by software 47 that allows its operating protocol and its data protocol to be configured to meet specific user needs. Thus, for example, the software 47 can be designed to accommodate multiple data formats and various telemetry limitations.

In another embodiment of the present invention the CPU 20 may be coupled to a communications interface 22 which may be a RS422 interface that provides for communication with an input device 34, an output device, or a combination of an input and output device 38. In yet another embodiment of the present invention, the input device 34 is a keyboard or keypad, and the output device 36 is a screened monitor or an alerting device.

In one embodiment of the present invention, the CPU 20 may also be coupled to a PROM 28, for storage of data used by the CPU 20. A SRAM 30 may also be coupled to the CPU 20 for storage of data. An SRAM may be designed such that data may be stored on capacitors, which do not require constant recharging to retain data. Other storage devices may also be utilized, for example dynamic random access memory (DRAM) devices, may also be utilized. DRAM devices typically store data in a cell made of a capacitor and a transistor. The capacitor of a DRAM device tends to lose data unless it's recharged frequently. In addition, the recharging of the DRAM device tends to slow down the performance of the DRAM. Accordingly, an SRAM device may be more suitable for data retention.

In another embodiment of the present invention, a flash memory device 32 may be coupled to the CPU 20 to assist in the storage of the data used by or generated by the CPU 20.

A system 10 in accordance with the present invention may be powered by a power source 56, for example, a +/−5 volts battery and/or a +28 volts battery that provides for the system 10 to operate on about 0.25 watts of power. Accordingly, the operating factor may be reduced by a factor of about 2-5 over known prior art.

In an embodiment of a system 10 in accordance with the present invention, the components of the system 10 are surface mount components that may be assembled on the fronts and backs of one or more cascading or stacked circuit boards. Overall, the system 10 may be a stand alone system and/or device of less than approximately $6 \times 6 \times 2$ cm$^3$ in size, have a resolution of approximately 250 channels, weigh less than or equal to approximately ninety (90) grams, operate on less than or approximately 0.25 watts of power, and have a radiation tolerance of about 100Krad. The system 10 may be constructed, such that it may not produce any interference, for example, waves, signals, pulses, noise, or charge that may affect other components. In one embodiment, one or more of the components of the digital components of the system 10 may be incorporated into an application specific integrated circuit (ASIC) or field programmable gate array (FPGA) design.

A radiation sensing device and/or system in accordance with the present invention may be utilized, for example, as a spectrometer that identifies the type of radiation sensed, as a radiation dosimeter that measures a total dose of radiation sensed, and/or as a sentinel that generates an alert when solar particle events occur. Although specific embodiments have been illustrated and described herein, it may be appreciated by those of ordinary skill in the art that any arrangement which may be calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of ordinary skill in the art will readily appreciate that the names or labels of the elements are not intended to limit embodiments. Furthermore, additional processes and apparatus can be added to the components, functions can be rearranged among the components, and new components, to correspond to future enhancements and physical devices used in embodiments, can be introduced without departing from the scope of embodiments. One of ordinary skill in the art readily will recognize that embodiments may be applicable to future communication devices, different systems, and new data types. The terminology used in this disclosure includes all alternate technologies that may provide the same functionality as described herein.

What is claimed is:

1. A space-based system for radiation sensing while traveling outside the earth's atmosphere, comprising:
   a high LET detector; and
   a low LET detector coupled to the high LET detector by a CPU, wherein the high LET detector and the low LET detector are assembled within a single radiation dosimeter unit capable of identifying radiation type and total dosage;

wherein the unit acts as a sentinel for a solar particle event.

2. The system of claim 1, wherein said single unit weighs less than about ninety grams.

3. The system of claim 1, wherein said single unit is portable by hand.

4. The system of claim 3, wherein said single unit weighs less than about ninety grams.

5. The system of claim 1, wherein the system operates on less than about 0.25 watts of power.

6. The system of claim 1, wherein the high LET detector is coupled to the CPU via a first analog-to-digital converter.

7. The system of claim 1, wherein the low LET detector is coupled to the CPU via a second analog-to-digital converter.

8. The system of claim 1, wherein the high LET detector and the low LET detector sense nuclear radiation.

9. The system of claim 1, wherein said single unit has a resolution of about 250 channels.

10. The system of claim 1, wherein said single unit may sense radiation energy in a high LET spectrum and a low LET spectrum.

11. A method of sensing radiation across a broad energy spectrum, comprising the steps of:
   providing a space based radiation monitoring device capable of sensing high LET radiation and low LET radiation while traveling outside the earth's atmosphere;
   sensing within a single radiation dosimeter unit capable of identifying radiation type and total dosage;
   wherein the unit acts as a sentinel for a solar particle event at least one of high LET radiation and low LET radiation;
   generating a radiation signal responsive to the at least one of high LET radiation and low LET radiation;
   outputting the radiation signal to a CPU.

12. The method of claim 11, wherein said radiation monitoring device may detect any one of the members of the group consisting of x-rays, gamma ray, photons, electrons positrons and muons.

13. The method of claim 11, wherein said radiation monitoring device may detect any one of the members of the group consisting of; galactic rays, solar cosmic rays, protons and neutrons.

14. The method of claim 11, wherein the sensing of the low LET radiation signal and the sensing of the high LET radiation signal is performed by a single unit.

15. The method of claim 14, wherein the single unit operates on less than about 0.25 watts.

16. The method of claim 14, wherein the single unit is portable by hand.

17. The method of claim 14, wherein said single unit has a resolution of about 250 channels.

18. A space-based system for radiation sensing while traveling outside the earth's atmosphere, comprising:
   a high LET detector; and
   a low LET detector coupled to the high LET detector by a CPU, wherein the high LET detector and the low LET detector are assembled within a single radiation dosimeter unit capable of identifying radiation type and total dosage, and wherein the system operates on a range of about 0 to about 0.25 watts of power and acts as a sentinel for a solar particle event.

19. A space-based system for radiation sensing while traveling outside the earth's atmosphere, comprising:
   a high LET detector; and,
   a low LET detector coupled to the high LET detector by a CPU, wherein the high LET detector and the low LET detector are assembled within a single unit capable of identifying radiation type and total dosage, and wherein the unit is less than or equal to about 72 cm$^3$ in size and acts as a sentinel for a solar particle event.

20. A space-based radiation sensing device for radiation sensing while traveling outside the earth's atmosphere, comprising:
   a high LET detector; and
   a low LET detector coupled to the high LET detector by a CPU, wherein the high LET detector and the low LET detector are assembled within a single unit capable of identifying radiation type and total dosage;
   wherein the unit acts as a sentinel for a solar particle event.

21. A space-based radiation sensing device for radiation sensing while traveling outside the earth's atmosphere, comprising:
   a high LET detector; and
   a low LET detector coupled to the high LET detector by a CPU, wherein the high LET detector and the low LET detector are assembled within a single unit capable of identifying radiation type and total dosage, and wherein the system operates on a range of about 0 to about 0.25 watts and the unit acts as a sentinel for a solar particle event.

22. The radiation sensing device of claim 21, wherein said single unit is less than or equal to about 72 cm$^3$ in size.

23. A space-based radiation sensing device for radiation sensing while traveling outside the earth's atmosphere, comprising:
   a high LET detector; and
   a low LET detector coupled to the high LET detector by a CPU, wherein the high LET detector and the low LET detector are assembled within a single unit capable of identifying radiation type and total dosage;
   wherein the unit acts as a sentinel for a solar particle even.

24. The radiation sensing device of claim 22, wherein the radiation sensed is nuclear radiation.

25. A space based radiation sensing device for radiation sensing while traveling outside the earth's atmosphere, comprising:
   a high LET detector; and
   a low LET detector coupled to the high LET detector by a CPU, wherein the high LET detector and the low LET detector are assembled within a single unit capable of identifying radiation type and total dosage, and wherein the unit is less than or equal to about 72 cm$^3$ in size.

26. A space based radiation sensing device for radiation sensing while traveling outside the earth's atmosphere, comprising:
   a high LET detection module; and
   a low LET detection module, wherein the high let detection module is electrically coupled to the low let detection module; assembled within a single radiation dosimeter unit capable of identifying radiation type and total dosage;
   wherein the unit acts as a sentinel for a solar particle event.

27. A device according to claim 26, wherein said high LET and low LET modules are coupled to a CPU external to the device.

* * * * *